United States Patent
Wang et al.

(10) Patent No.: US 11,714,013 B2
(45) Date of Patent: Aug. 1, 2023

(54) TORQUE SENSOR (71) Applicant: PEGATRON CORPORATION, Taipei (TW)

(72) Inventors: Wen-Hung Wang, Taipei (TW); Pei-Chin Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 97 days.

(21) Appl. No.: 17/542,308

(22) Filed: Dec. 3, 2021

(65) Prior Publication Data

US 2022/0291064 A1    Sep. 15, 2022

(30) Foreign Application Priority Data

Mar. 12, 2021 (TW) .................................. 110108849

(51) Int. Cl.
| | | |
|---|---|---|
| *G01L 3/10* | (2006.01) | |
| *B62J 45/421* | (2020.01) | |
| *B62J 45/411* | (2020.01) | |
| *G01L 5/00* | (2006.01) | |

(52) U.S. Cl.
CPC ............. *G01L 3/101* (2013.01); *B62J 45/411* (2020.02); *B62J 45/421* (2020.02); *G01L 5/0042* (2013.01)

(58) Field of Classification Search
CPC ....... G01L 3/101; G01L 5/0042; G01L 5/225; G01L 1/12; G01L 1/122; B62J 45/411; B62J 45/421; B62M 6/50; B62M 6/55
See application file for complete search history.

(56) References Cited

U.S. PATENT DOCUMENTS

| | | | | |
|---|---|---|---|---|
| 8,925,395 | B2 * | 1/2015 | Hsu ........................ | G01L 3/1435 73/862.635 |
| 8,960,021 | B2 * | 2/2015 | Wu ........................ | G01L 3/1478 73/862.333 |
| 9,855,991 | B2 * | 1/2018 | Bendel ..................... | G01L 1/165 |
| 10,308,314 | B2 * | 6/2019 | Gao ......................... | G01L 3/108 |
| 10,399,636 | B2 * | 9/2019 | Greven ..................... | B62M 6/75 |
| 11,320,328 | B2 * | 5/2022 | Hsu .......................... | G01L 3/101 |
| 2016/0185419 | A1 * | 6/2016 | Bendel ..................... | B62M 6/55 180/220 |
| 2021/0381544 | A1 * | 12/2021 | Li ............................ | B62M 6/50 |

FOREIGN PATENT DOCUMENTS

| | | |
|---|---|---|
| CN | 101258390 | 9/2008 |
| TW | 201409005 | 3/2014 |
| TW | 202028712 | 8/2020 |

\* cited by examiner

*Primary Examiner* — Freddie Kirkland, III
(74) *Attorney, Agent, or Firm* — J.C. Patents (57) ABSTRACT

A torsion sensor, including a casing assembly, a sleeve set, a driven slider, a driving slider, an elastic member, a magnetic sensor, and a magnetic member is provided. The sleeve set includes a first sleeve, a second sleeve, and a third sleeve. The first sleeve is disposed in the casing assembly. The second sleeve has a neck portion sleeved on the second side of the first sleeve. The third sleeve is disposed between the first and the second sleeves. The driven slider is connected to a head portion of the second sleeve. The driving slider surrounds an outer side of the driven slider. The elastic member surrounds an outer side of the second sleeve. One of the magnetic sensor and the magnetic member is disposed in the casing assembly, and the other one is disposed in the sleeve set. The magnetic sensor and the magnetic member are disposed opposite to each other.

10 Claims, 9 Drawing Sheets

FIG. 8

TORQUE SENSOR

CROSS-REFERENCE TO RELATED APPLICATION

This application claims the priority benefit of Taiwan application serial no. 110108849, filed on Mar. 12, 2021. The entirety of the above-mentioned patent application is hereby incorporated by reference herein and made a part of this specification.

BACKGROUND

Technical Field

The disclosure relates to a sensor, and more particularly, to a torque sensor.

Description of Related Art

Common torque sensors have contact and non-contact torque sensors. Contact torque sensors mostly use strain gauges of piezoelectric materials, and are applied to torque meters or electric motor-assisted bicycles. Non-contact torque sensors mostly use surface acoustic wave sensing or magnetostriction, and the above two may also be applied to the torque sensing of the electric motor-assisted bicycles.

SUMMARY

The disclosure provides a torsion sensor, which, compared with a conventional practice, has advantages of lighter weight and lower cost.

A torsion sensor in the disclosure includes a casing assembly, a sleeve set, a driven slider, a driving slider, an elastic member, a magnetic sensor, and a magnetic member. The sleeve set includes a first sleeve, a second sleeve, and a third sleeve. The first sleeve is disposed in the casing assembly, and has a first side and a second side. The second sleeve has a head portion and a neck portion connected with each other, and the neck portion is sleeved on the second side of the first sleeve. The third sleeve is disposed between the first sleeve and the second sleeve. The driven slider is connected to the head portion of the second sleeve. The driving slider is disposed to surround an outer side of the driven slider, and the driving slider and the driven slider may rotate relatively. The driving slider has a first cam portion, and the driven slider has a second cam portion. The second cam portion and the first cam portion contact each other. The elastic member is disposed to surround an outer side of the second sleeve. One end of the elastic member abuts the third sleeve, and the other end of the elastic member abuts the head portion of the second sleeve. One of the magnetic sensor and the magnetic member is disposed in the casing assembly, and the other one of the magnetic sensor and the magnetic member is disposed in the sleeve set. The magnetic sensor and the magnetic member are disposed opposite to each other. when an external force is applied to the torque sensor, enabling the driving slider and the driven slider to rotate relatively, the first cam portion and the second cam portion guide each other to enable the driving slider and the driven slider to generate a relative displacement, so that the driving slider pushes the second sleeve to move relative to the first sleeve, so as to change a relative distance between the magnetic member and the magnetic sensor to obtain a variation in a magnetic flux.

In an embodiment of the disclosure, the magnetic member moves relative to the magnetic sensor.

In an embodiment of the disclosure, the casing assembly has a groove. The head portion of the second sleeve has a wing portion, and the wing portion is located in the groove. One of the magnetic sensor and the magnetic member is disposed in the groove, and the other one of the magnetic sensor and the magnetic member is disposed on the wing portion.

In an embodiment of the disclosure, the torque sensor further includes at least one rolling ball disposed in one of the first cam portion and the second cam portion, and facing an engaging surface of the other one of the first cam portion and the second cam portion.

In an embodiment of the disclosure, the driving slider has a guiding pin, and the driven slider has a guiding groove. The guiding groove extends along a circumferential direction of the driven slider by ¼ of a circumference of the driven slider, and the guiding pin is disposed in the guiding groove.

In an embodiment of the disclosure, the guiding groove has a first end and a second end.

In an embodiment of the disclosure, the first sleeve is a spring adjusting screw, and is threadedly engaged with the third sleeve.

In an embodiment of the disclosure, the third sleeve has a body, a cantilever protruding and extending from the body, and a bottom. The other one of the magnetic sensor and the magnetic member is disposed on the cantilever. The cantilever has a first surface, and the bottom has a second surface. The first surface and the second surface contact each other, and at least one of the first surface and the second surface is an inclined surface. When the second sleeve moves relative to the first sleeve, the first surface and the second surface move relatively to change the relative distance between the magnetic member and the magnetic sensor.

In an embodiment of the disclosure, the torque sensor further includes a friction plate disposed between the driven slider and the second sleeve.

In an embodiment of the disclosure, the torque sensor further includes a first ball bearing and a second ball bearing. The first ball bearing is sleeved on the first side of the first sleeve. The second ball bearing is sleeved on a fourth side of the driving slider. The head portion has a third side, and the fourth side is sleeved on the third side corresponding to the driving slider.

Based on the above, an elastic force of the elastic member in the torque sensor of the disclosure may be fine-tuned according to manufacturing requirements, which is also convenient for fine-tuning a torque load during maintenance in the future.

DETAILED DESCRIPTION OF DISCLOSED EMBODIMENTS

The First Embodiment

Figure 1:
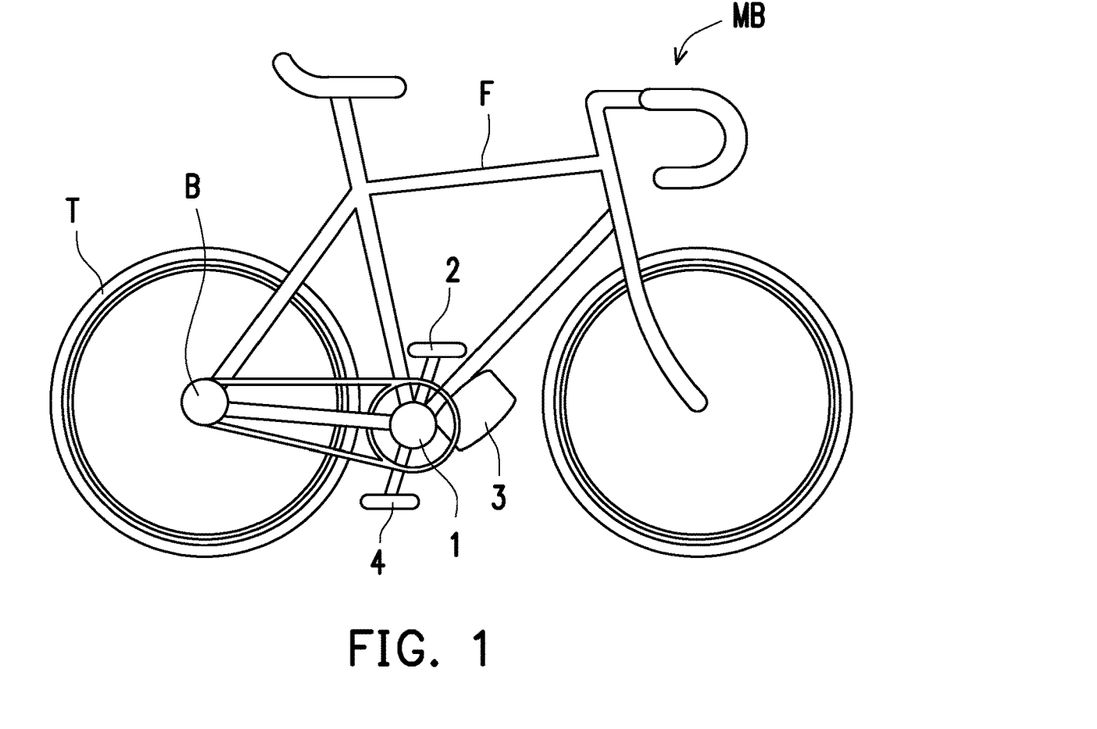
FIG. 1 is a schematic view of an electric motor-assisted bicycle to which a torque sensor of the disclosure is applied.
Figure 2:
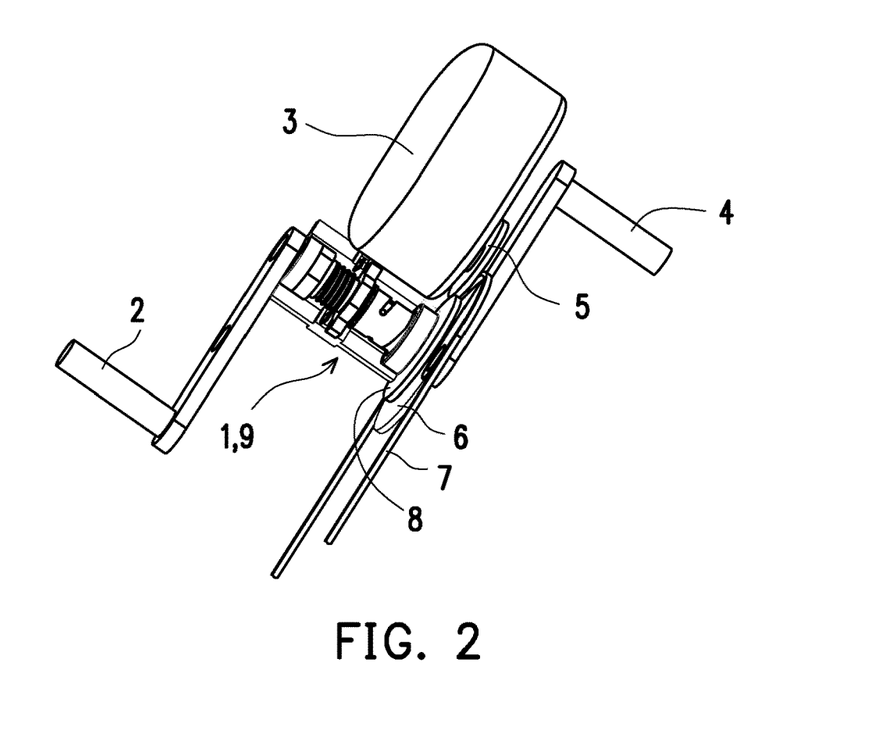
FIG. 2 is a partial schematic view of FIG. 1.

FIG. 1 is a schematic view of an electric motor-assisted bicycle to which a torque sensor of the disclosure is applied. FIG. 2 is a partial schematic view of FIG. 1. Referring to both FIGS. 1 and 2, a torque sensor 1 in this embodiment may be applied to an electric motor-assisted bicycle MB (hereinafter referred to as a bicycle). The torque sensor 1 is linked with an electric motor 3 and pedal cranks 2 and 4.

In this embodiment, the torque sensor 1 is disposed in a crank transmission shaft 9 of the bicycle MB and combined with the crank transmission shaft 9. The electric motor 3 is fixed to a frame F, and the electric motor 3 is linked with the torque sensor 1 through a transmission gear.

Specifically, the bicycle MB has the pedal cranks 2 and 4 for allowing a rider's feet to apply force. The electric motor 3 is a source of auxiliary power. A transmission gear 5 of an electric motor is engaged with a transmission gear 8 of a sensor for transmission, so that the auxiliary power of the electric motor 3 is output through the transmission gear 5 of the electric motor.

A crank transmission gear plate 6 of the bicycle MB is fixed on the crank transmission shaft 9 and engaged with a transmission gear chain 7 to be transmitted to a rear-wheel gear set B.

The transmission gear 8 of the sensor is fixed on the crank transmission shaft 9, and engaged with the transmission gear 5 of the electric motor to receive the electric auxiliary power from the electric motor 3.

The crank transmission shaft 9 is an axis connecting the cranks at pedal force-applied ends. A torque force generated by rotation of the crank transmission shaft 9 is linked to the transmission gear 8 of the sensor and the crank transmission gear plate 6, thereby receiving power assistance of the electric motor 3 and connecting a sprocket to a rear wheel T of the bike to output power.

Figure 3:
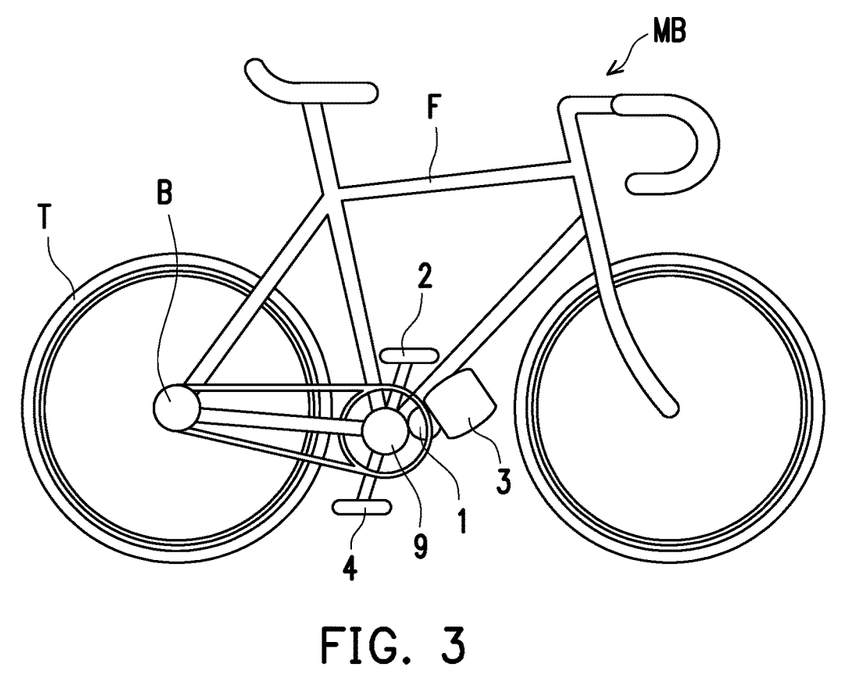
FIG. 3 is a schematic view of another assembly method of the torque sensor, an electric motor, and a pedal crank in a bicycle of FIG. 1
Figure 4:
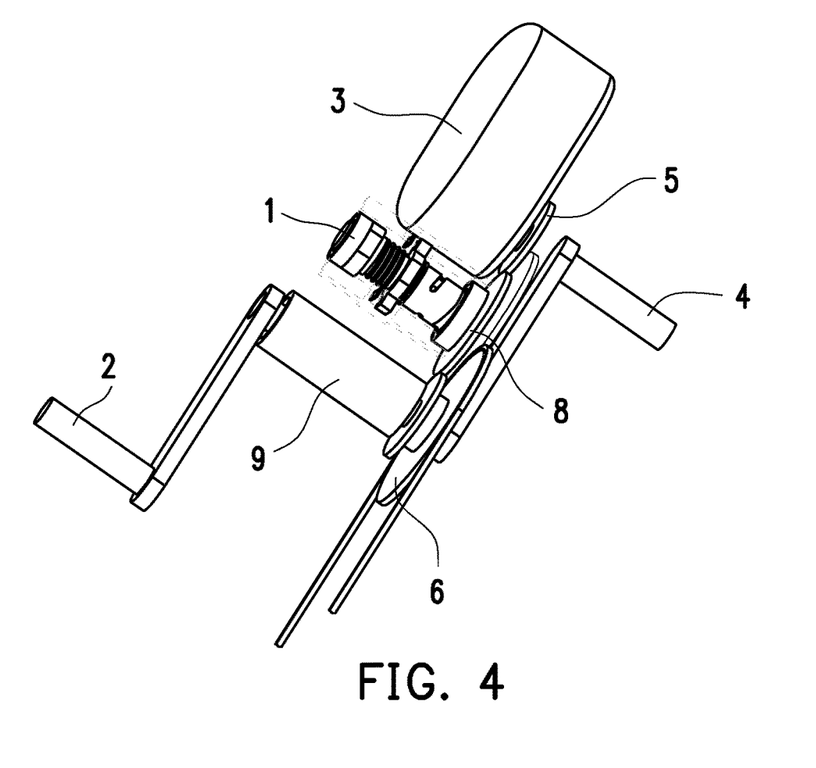
FIG. 4 is a partial schematic diagram of FIG. 3.

FIG. 3 is a schematic view of another assembly method of the torque sensor, an electric motor, and a pedal crank in a bicycle of FIG. 1. FIG. 4 is a partial schematic diagram of FIG. 3. Referring to FIGS. 3 and 4, in another embodiment, the torque sensor 1 is disposed between the crank transmission shaft 9 and the electric motor 3, and the torque sensor 1, the crank transmission shaft 9, and the electric motor 3 are linked through the respective transmission gears. Here, the description will not be repeated.

In the bicycle MB as shown in FIG. 1, a casing assembly 1a (which will be described later) of the torque sensor 1 may be integrally formed with the crank transmission shaft 9 in structure as a kit and fixed on the frame F. In addition, it may also be the bicycle MB as shown in FIG. 3, in which the torsion sensor 1 and the crank transmission shaft 9 form a separate unitary kit and are fixed on the frame F, and a disposing method is chosen according to requirements.

Figure 5:
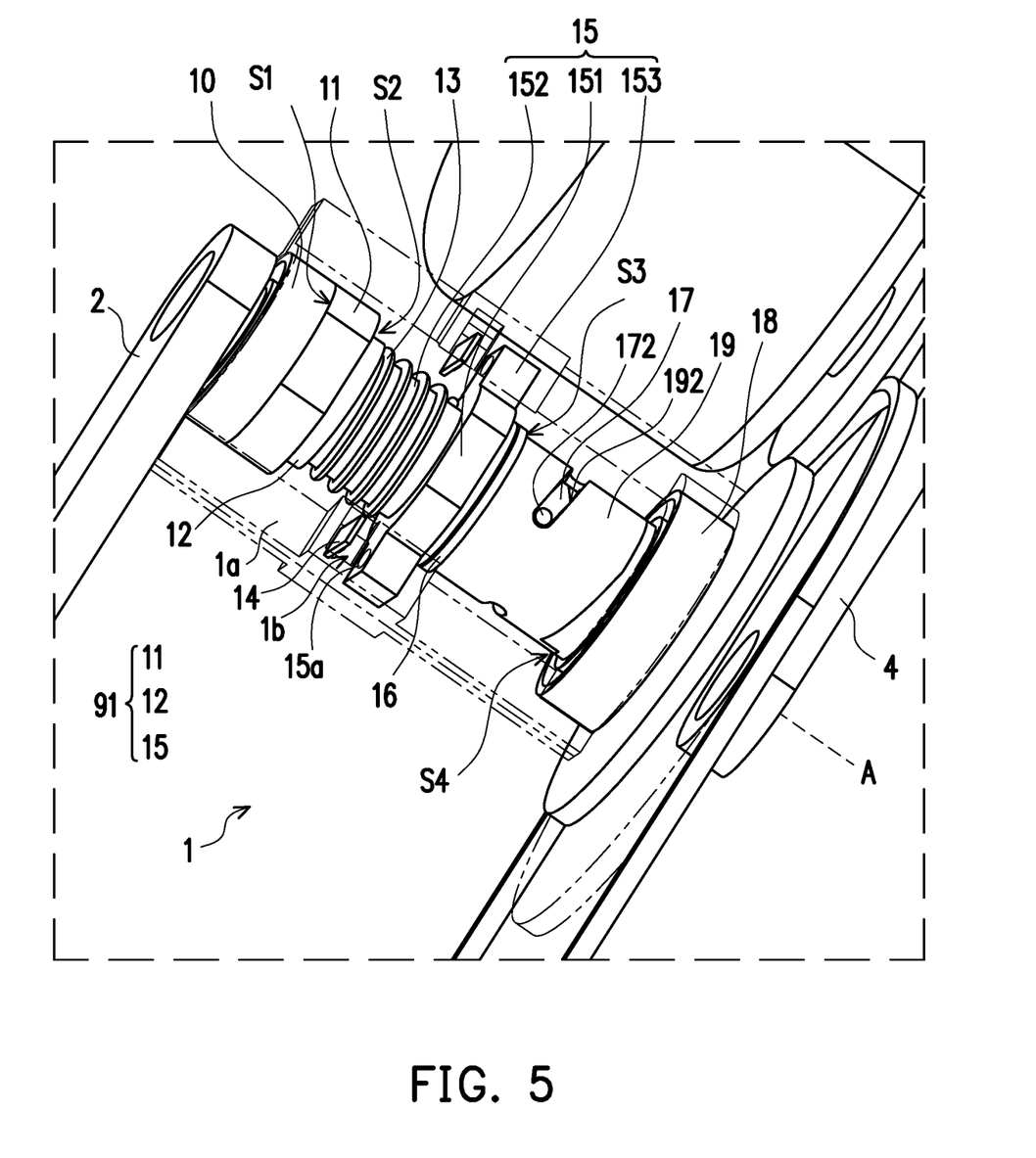
FIG. 5 is a schematic view of a torque sensor 1 applied to the bicycle of FIGS. 1 and 3.

FIG. 5 is a schematic view of the torque sensor 1 applied to the bicycle of FIGS. 1 and 3. Referring to FIG. 5, the torque sensor 1 in this embodiment includes the casing assembly 1a, a sleeve set 91, a first ball bearing 10, a driving slider 17, a second ball bearing 18, an elastic member 13, a magnetic sensor 14, and a magnetic member 15a.

The sleeve set 91 includes a first sleeve 11, a second sleeve 15, and a third sleeve 12. The first sleeve 11 is fixedly disposed in the casing assembly 1a. The first sleeve 11 has an axial direction A, and a first side S1 and a second side S2 located on two opposite sides in the axial direction A. The first ball bearing 10 is sleeved on the first side S1 of the first sleeve 11 along the axial direction A, and is connected to the pedal crank 2 on a left side. The first sleeve 11 is formed by wear-resistant plastic, or a wear-resistant and non-magnetic metal material.

The description related to sleeving such as a first element is sleeved on a second element, or the first element and the second element are sleeved on each other in the text refers to the first element and the second element are disposed coaxially, and have a relationship of an exterior covering and an interior. That is, one element is sleeved around an outer surface of another element. In some cases, the sleeved first element and the second element may also rotate relative to each other.

The second sleeve 15 has a head portion 151 and a neck portion 152. The head portion 151 is connected to the neck portion 152, and a diameter of the head portion 151 is greater than a diameter of the neck portion 152. The neck portion 152 of the second sleeve 15 is sleeved on the second side S2 of the first sleeve 11 along the axial direction A.

The third sleeve 12 is disposed between the first sleeve 11 and the second sleeve 15.

The driving slider 17 has a third side S3 and a fourth side S4. The third side S3 is sleeved on the head portion 151 of the second sleeve 15 along the axial direction A. The second ball bearing 18 is sleeved on the fourth side S4 of the driving slider 17 along the axial direction A, and the second ball bearing 18 is connected to the pedal crank 4 on a right side.

The first ball bearing 10 and the second ball bearing 18 are disposed at two ends of the torque sensor 1 and fixed to the crank transmission shaft 9, which may ensure smooth rotation of the torque sensor 1.

The elastic member 13 is a compression spring, which is sleeved outside the second sleeve 15. One end of the elastic member 13 abuts the third sleeve 12, and the other end of the elastic member 13 abuts the head portion 151 of the second sleeve 15. The elastic member 13 may provide an elastic restoring force for reciprocating the second sleeve 15 along the axial direction A. In other embodiments, the elastic member 13 may also be replaced by a soft rubber-like elastic material.

The magnetic sensor 14 is disposed in the casing assembly 1a, and the magnetic member 15a is disposed on the head portion 151 of the second sleeve 15. Disposing positions of the magnetic sensor 14 and the magnetic member 15a correspond to each other. Specifically, the casing assembly 1a has a groove 1b, and the magnetic sensor 14 is disposed on a side wall (not labeled) of the groove 1b. The side wall faces the head portion 151 of the second sleeve 15. In this embodiment, the magnetic sensor 14 is a Hall sensor.

In addition, the head portion 151 of the second sleeve 15 further has a wing portion 153 protruding and extending along a radial direction, and the wing portion 153 is located in the groove 1b. The magnetic member 15a is disposed on a surface (not shown) of the wing portion 153 facing the magnetic sensor 14.

Of course, the disposing positions of the magnetic sensor 14 and the magnetic member 15a are not limited to the above manner. It is also possible to dispose the magnetic member 15a on a surface of the groove 1b facing the wing portion 153, and dispose the magnetic sensor 14 on the surface of the wing portion 153 facing the magnetic sensor 14. In addition, the wing portion 153 may be formed by a magnetic material directly when the wing portion 153 is formed. The magnetic member 15a in this embodiment may be a permanent magnet or an electromagnet, which may be selected according to the requirements.

The number of the magnetic sensors 14 corresponds to the number of the magnetic members 15a. In this embodiment, the number of the magnetic sensors 14 is a pair, and the number of the magnetic members 15a is also a pair. The magnetic sensor 14 is used to sense a variation in a magnetic flux between the magnetic sensor 14 and the magnetic member 15a due to a difference in distance, and convert the variation in the magnetic flux into a voltage to be transmitted to an electric motor controller to control an auxiliary horsepower output.

The torque sensor 1 further includes a driven slider 19 sleeved with the driving slider 17. The driving slider 17 has a first cam portion 171 (see FIG. 6A), and the driven slider 19 has a second cam portion 191 (see FIG. 6B). The first cam portion 171 is a slope-shaped structure formed on the driving slider 17. The second cam portion 191 is a slope-shaped structure formed on the driven slider 19. The first cam portion 171 and the second portion 191 are the structures that contact and interfere with each other.

Figure 6A:
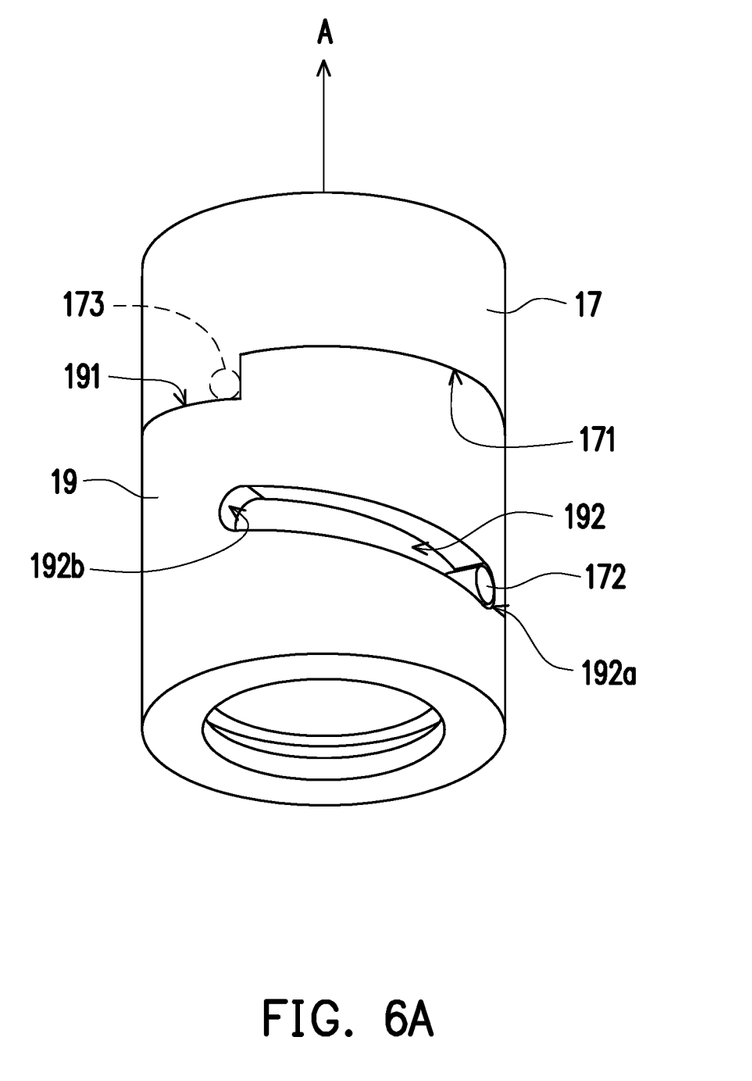
FIGS. 6A to 6C are views of steps in which a driving slider 17 rotates relative to a driven slider 19.
Figure 6B:
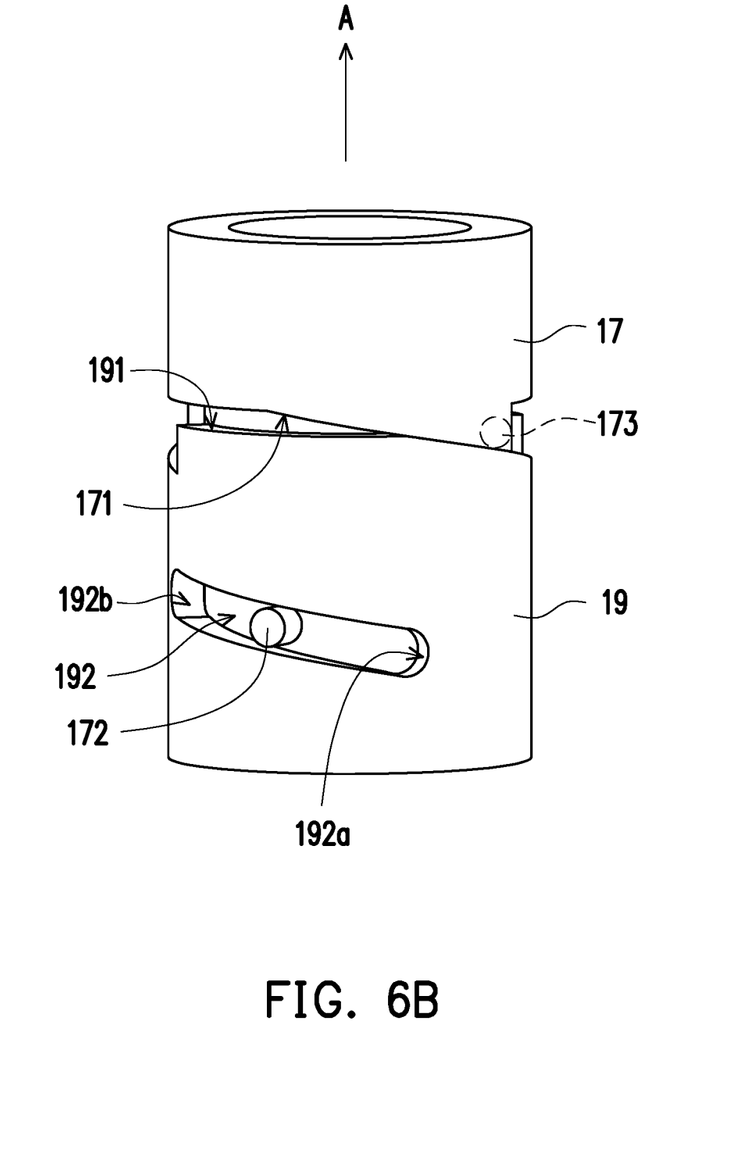

When the driving slider 17 and the driven slider 19 rotate relatively, a guidance is generated between the first cam portion 171 and the second cam portion 191 to drive the slider 17 and the driven slider 19 to generate a relative displacement along the axial direction A.

By the way, a circular rolling element (not shown) may be disposed between the first cam portion 171 and the second cam portion 191 in the slope-shaped structure, so as to reduce abrasion of an actuating engaging surface.

In addition, the driving slider 17 has a guiding pin 172, and the driven slider 19 has a guiding groove 192. The guiding groove 192 in this embodiment extends along a circumferential direction of the driven slider 19 by ¼ of a circumference of the driven slider 19, and the guiding pin 172 is disposed in the guiding groove 192.

In this embodiment, the number of the guiding grooves 192 is a pair, and the guiding grooves 192 are disposed equiangularly along the circumferential direction of the driven slider 19. Correspondingly, the number of the guiding pins 172 is also a pair. In this way, the driving slider 17 and the driven slider 19 may be symmetrically rotated relative to each other.

The guiding groove 192 has a first end 192a and a second end 192b, and the first end 192a and the second end 192b are located at different positions in the axial direction A. Specifically, in the axial direction A, the first end 192a and the second end 192b have different heights.

The driving slider 17 is engaged with the crank transmission shaft 9, and the driving slider 17 and the crank transmission shaft 9 increase engaging forces of the two to bear the torque force through a hub 21.

In addition, the torque sensor 1 may further include a friction plate 16 disposed between the driven slider 19 and the second sleeve 15. The number of the friction plates 16 may be determined according to the requirements. In this embodiment, the number of the friction plates 16 is two. One of the friction plates 16 is fixed on the head portion 151 of the second sleeve, and the other one of the friction plates 16 is disposed close to the driven slider 19.

By the way, a positioning groove (not shown) may be disposed on the third side S3 of the driving slider 17 close to the head portion 151 of the second sleeve 15, so that the friction plate 16 may be correspondingly disposed in the positioning groove.

The first sleeve 11 may be a spring adjusting screw, and the first sleeve 11 and the third sleeve 12 are threadedly engaged to adjust a compression amount of the compressed elastic member 13. A distance between the second sleeve 15 and the third sleeve 12 is a motion range of compression of the elastic member 13, and the initial compression amount of the elastic member 13 is adjusted and set by the spring adjusting screw.

The friction plate 16 is disposed between the second sleeve 15 and the driven slider 19 to improve rotational friction between the second sleeve 15 and the driven cam slider 19 when the driven slider 19 rotates. The friction plate 16 is formed by a material with wear resistance and an appropriate friction coefficient to provide frictional force, impedance, and abrasion.

In addition, the friction plate 16 may also be replaced by a rotary damper with high viscosity, which may reduce friction dust and increase the service life. The friction plate may also be replaced by a thrust bearing.

Referring to FIGS. 1, 2, and 5, when the rider is riding the bicycle MB, the force is applied to the pedal cranks 2 and 4 on the left and right sides of the bicycle MB, and the torque force is transmitted to the crank transmission shaft 9 when the pedal cranks 2 and 4 are operating.

Specifically, when the torque force of the pedal from the rider is less than a preset value (where the preset value is related to the force provided by the elastic member 13), the driving slider 17 and the driven slider 19 rotate together, and the driving slider 17 and the driven slider 19 have no rotational misalignment.

When the rider feels strenuous when pedaling (it is not easy to pedal on the pedal cranks 2 and 4), such as when climbing a hill, since the torque sensor 1 is linked to the crank transmission shaft 9, with rotation of the pedal cranks 2 and 4, the driving slider 17 in the torque sensor 1 rotates relative to the driven slider 19 with the axial direction A as an axis of rotation and is misaligned when the torque force is increased to be greater than a force of the elastic member 13.

Figure 6C:
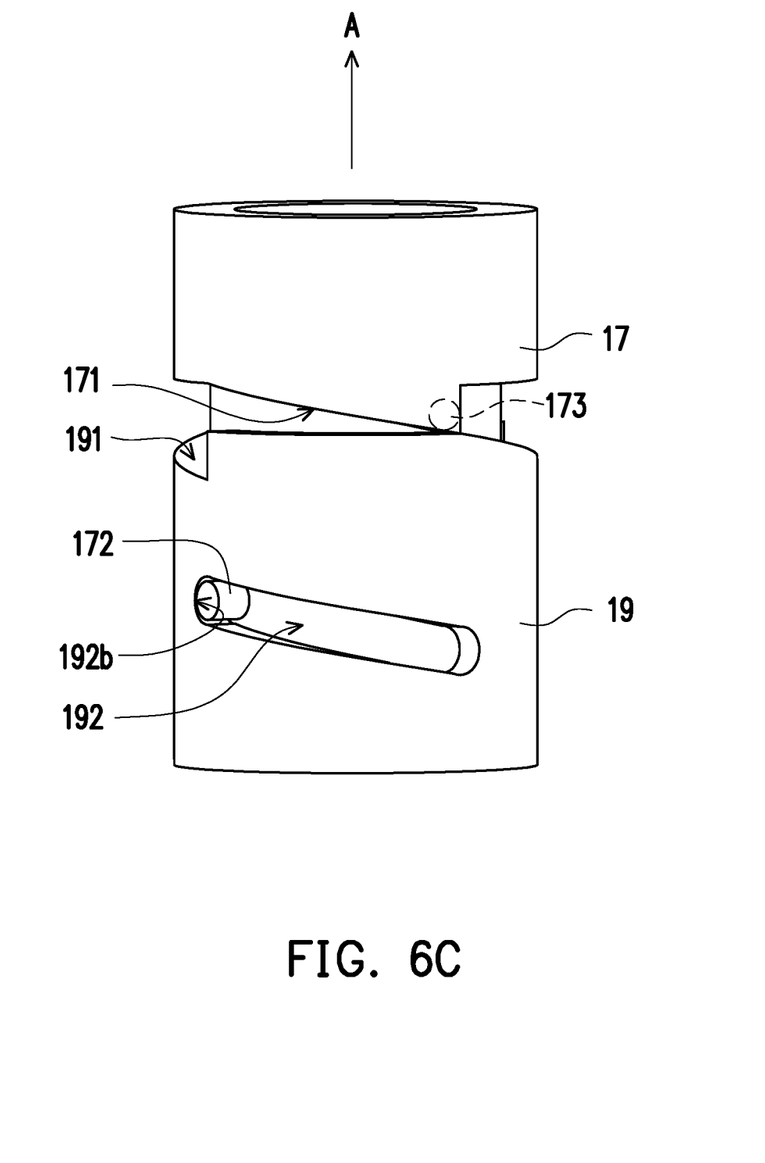
Figure 7A:
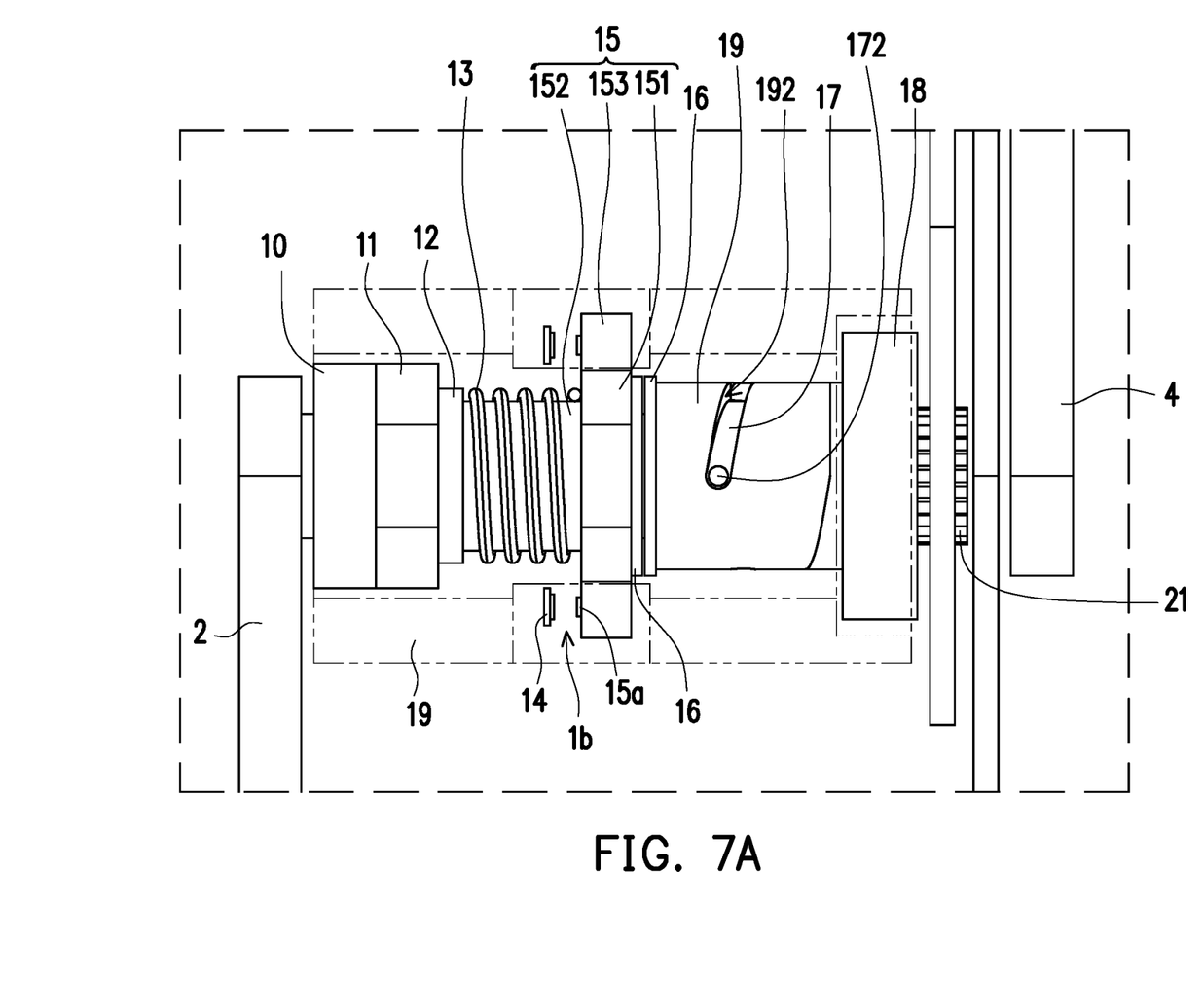
FIG. 7A is a schematic view of a condition of the entire torque sensor corresponding to FIG. 6A.
Figure 7B:
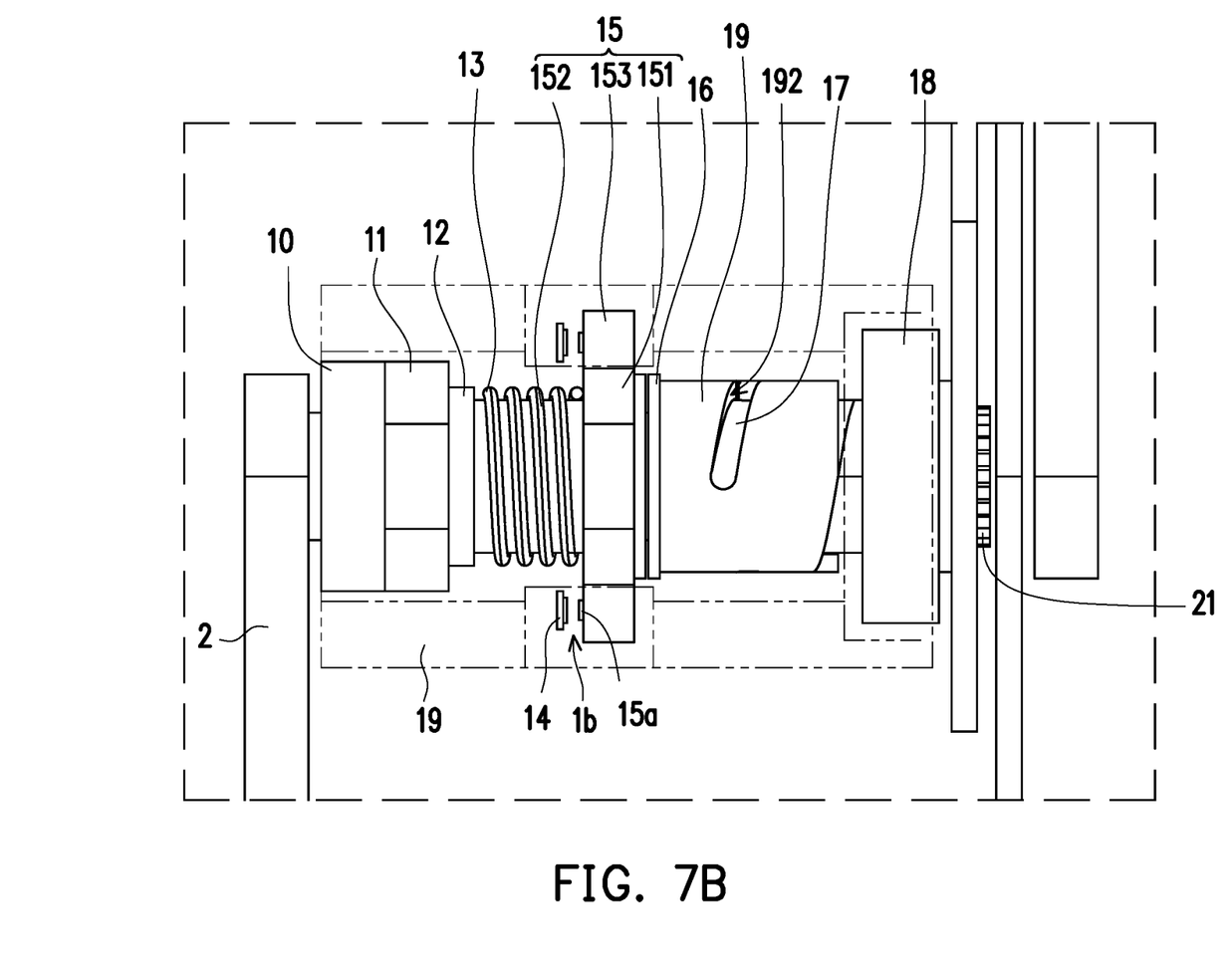
FIG. 7B is a schematic view of a condition of the entire torque sensor corresponding to FIG. 6C.

FIGS. 6A to 6C are views of steps in which the driving slider 17 rotates relative to the driven slider 19. FIG. 7A is a schematic view of a condition of the entire torque sensor corresponding to FIG. 6A. FIG. 7B is a schematic view of a condition of the entire torque sensor corresponding to FIG. 6C.

Referring to FIGS. 5, 6A, and 7A together, when the guiding pin 172 is located at the first end 192a of the guiding groove, the first cam portion 171 and the second cam portion 191 are conformally engaged with each other at this time. Here, the conformal engagement means that one of the two is a convex shape, and the other is a concave shape complementary to the convex shape. Sizes of the concave and convex shapes are adapted to each other, and may be engaged with each other.

Referring to FIGS. 6A, 6B, and 7A, the first cam portion 171 and the second cam portion 191 are also the slope-shaped structures. Therefore, when the driving slider 17 rotates relative to the driven slider 19, the guidance is generated between the first cam portion 171 and the second cam portion 191, and the driving slider 17 pushes the driven slider 19 to move toward the first ball bearing 10 in the axial direction A.

Referring to FIGS. 6B, 6C, and 7B together, at the same time, rotation of the driving slider 17 drives the first cam portion 171 to press the second cam portion 191, so that the guiding pin 172 moves in the guiding groove 192 from the first end 192a to the second end 192b. A rolling ball 173 may be disposed in the first cam portion 171. The rolling ball 173 is disposed close to the first cam portion to be engaged with an engaging surface of the second cam portion 191, and may slightly protrude from an engaging surface of the first cam portion 171 engaged with the second cam portion 191. A disposition of the rolling ball 173 may reduce friction loss of the two engaging surfaces when the first cam portion 171 and the second cam portion 191 rotate relatively. The number of the rolling balls 173 may be changed according to the requirements, and may also be disposed on the engaging surface of the second cam portion 191 engaged with the first cam portion 171. In addition, the rolling ball 173 may be disposed at both the first cam portion 171 and the second portion 191. Since the driven slider 19 moves toward the first ball bearing 10 in the axial direction A, the driven slider 19 pushes the second sleeve 15 to move toward the first ball bearing 10 in the axial direction A.

Specifically, the driving slider 17 pushes the driven slider 19 along the axial direction A to drive the second sleeve 15 to move toward the first ball bearing 10. The elastic member 13 sleeved outside the second sleeve 15 abuts between the head portion 151 of the second sleeve 15 and the third sleeve 12, and a pressing force of the friction plate 16 pressing the second sleeve 15 is greater than an elastic restoring force of the elastic member 13. Therefore, as the second sleeve 15 moves, the elastic member 13 is compressed, and the second sleeve 15 moves toward the first ball bearing 10 along the axial direction A.

At this time, a distance between the magnetic member 15a disposed on the wing portion 153 of the head portion 151 of the second sleeve 15 and the magnetic sensor 14 is shortened, and the magnetic flux obtained by the magnetic sensor 14 is relatively increased. The magnetic sensor 14 converts the variation in the magnetic flux into the voltage to be transmitted to the electric motor controller, and may control the motor to rotate and output a corresponding auxiliary torque value according to the change in the voltage value. The auxiliary torque value is engaged and transmitted to the transmission gear 8 of the sensor through the transmission gear 5 of the electric motor at an output end of the motor rotation, thereby providing the rider with auxiliary torque force.

For example, when the rider needs to accelerate the speed to climb the hill, the greater the torque force of transmission, the greater the magnetic flux, and the greater the auxiliary torque value corresponding to the output of motor rotation.

Conversely, when the auxiliary torque force provided by the electric motor 3 increases, so that the torque force that the rider needs to apply on the pedal cranks 2 and 4 decreases, and the torque force actuating on the drive slider 17 also decreases, the elastic restoring force provided by the elastic member 13 drives the second sleeve 15 to be reset. When the second sleeve 15 is reset, it also drives the driven slider 19 to rotate, thereby driving the driving slider 17 to return to an original position, so that the distance between the magnetic member 15a and the magnetic sensor 14 is gradually extended, and the magnetic flux is also relatively gradually reduced.

In light of the above, when the demand for the torque force transmitted by the pedal cranks 2 and 4 from the user (due to the auxiliary torque force provided by the electric motor 3 or a pedaling force reduced by the rider) gradually decreases, the distance between the magnetic member 15a and the magnetic sensor 14 is gradually extended, and the magnetic flux is gradually reduced. Correspondingly, the auxiliary torque value corresponding to the output of the motor rotation is gradually reduced.

In light of the above, through a change in the distance between the magnetic member 15a and the magnetic sensor 14, the effect of converting the rotational torque force into a reciprocating movement of the axial direction A is achieved, and the torque sensor 1 may be used to control the electric motor 3 to provide the appropriate horsepower output.

By the way, since the guiding groove 192 extends along the circumferential direction of the driven slider 19 by ¼ of the circumference of the driven slider 19, even if the driving slider 17 pushes the driven slider 19 to starting rotating relative to each other, the driving slider 17 and the driven slider 19 are not misaligned to 90 degrees, depending on a torque force and a length of the guiding groove 192. In other words, when the guiding pin 172 moves from the first end 192a to the second end 192b, restricted by the length of the guiding groove 192, the driving slider 17 and the driven slider 19 rotate together while maintaining a misaligned state.

The First Embodiment

Figure 8:
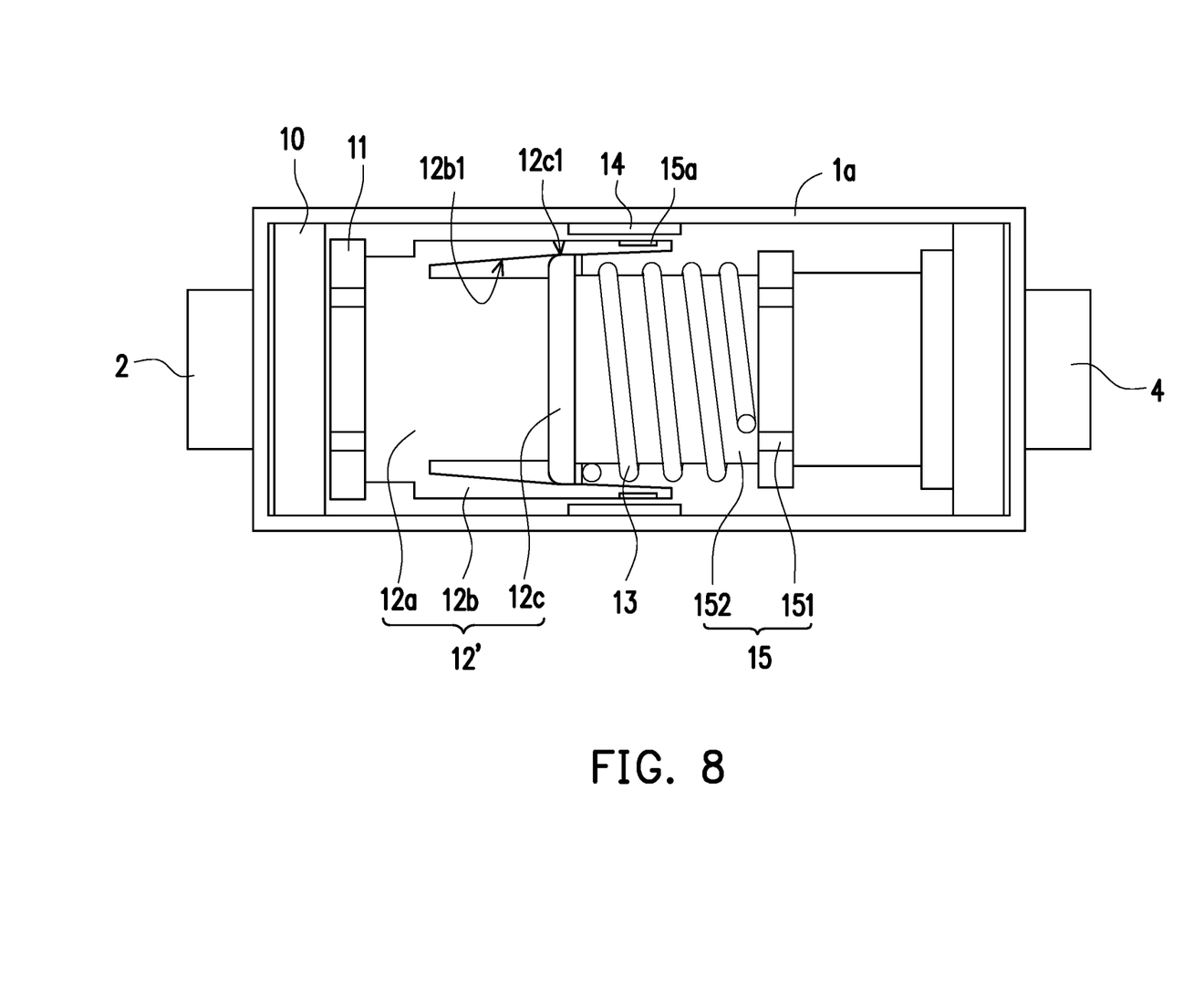
FIG. 8 is a schematic view of a torque sensor according to a second embodiment of the disclosure.

FIG. 8 is a schematic view of a torque sensor according to a second embodiment of the disclosure. Referring to both FIGS. 5 and 8, this embodiment is substantially the same as the foregoing first embodiment, and a difference between the two is that the magnetic member 15a and the magnetic sensor 14 in the first embodiment have the change in the distance along the axial direction A. Therefore, corresponding changes have been made to structures of the components and a configuration architecture, which will be described in detail as follows.

Referring to FIG. 8, a third sleeve 12' in this embodiment has a body 12a, a cantilever 12b protruding from the body 12a and extending along the axial direction A, and a bottom 12c. The cantilever 12b has a first surface 12b1, and the bottom 12c has a second surface 12c1. The first surface 12b1 and the second surface 12c1 contact each other, and at least one of the first surface 12b1 and the second surface 12c1 is an inclined surface.

In this embodiment, the magnetic sensor 14 is disposed on the first surface 12b1 of the cantilever 12b, and the magnetic member 15a is disposed on the second surface 12c1. Of course, it is also possible that the magnetic sensor 14 is disposed on the second surface 12c1, and the magnetic member 15a is disposed on the first surface 12b1.

With such a configuration, when the second sleeve 15 reciprocates along the axial direction A, one of the first surface 12b1 and the second surface 12c1 contacting each other is the inclined surface, so that the magnetic member 15a may move along the radial direction relative to the magnetic sensor 14 to change the magnetic flux.

This embodiment is described by applying the torque sensor to the bicycle, but the disclosure is not limited thereto. The torque sensor may also be applied to a torque meter.

Based on the above, compared with the conventional torque sensor, the torque sensor in the disclosure has advantages of lighter weight and lower cost.

In addition, a torque load of the torque sensor may also be fine-tuned and set according to the requirements, and such a configuration architecture is also convenient for fine-tuning the torque load during maintenance in the future.

What is claimed is:

1. A torque sensor, comprising:
    a casing assembly;
    a sleeve set, comprising:
        a first sleeve disposed in the casing assembly and having a first side and a second side;
        a second sleeve having a head portion and a neck portion, wherein the head portion is connected to the neck portion, and the neck portion is sleeved on the second side of the first sleeve;
        a third sleeve disposed between the first sleeve and the second sleeve;
    a driven slider connected to the head portion of the second sleeve;
    a driving slider disposed to surround an outer side of the driven slider, wherein the driving slider and the driven slider are able to rotate relatively, the driving slider has a first cam portion, the driven slider has a second cam portion, and the second cam portion and the first cam portion contact each other;
    an elastic member disposed to surround an outer side of the second sleeve, wherein one end of the elastic member abuts the third sleeve, and another end of the elastic member abuts the head portion of the second sleeve;
    a magnetic sensor and a magnetic member, wherein one of the magnetic sensor and the magnetic member is disposed in the casing assembly, and the other one of the magnetic sensor and the magnetic member is disposed in the sleeve set, wherein positions of the magnetic sensor and the magnetic member are disposed correspondingly,
    when an external force is applied to the torque sensor, enabling the driving slider and the driven slider to rotate relatively, the first cam portion and the second cam portion guide each other to enable the driving slider and the driven slider to generate a relative displacement, so that the driving slider pushes the second sleeve to move relative to the first sleeve, so as to change a relative distance between the magnetic member and the magnetic sensor to obtain a variation in a magnetic flux.

2. The torque sensor according to claim 1, wherein the magnetic member moves relative to the magnetic sensor.

3. The torque sensor according to claim 2, wherein the casing assembly has a groove, the head portion of the second sleeve has a wing portion, and the wing portion is located in the groove, one of the magnetic sensor and the magnetic member is disposed in the groove, and the other one of the magnetic sensor and the magnetic member is disposed on the wing portion.

4. The torque sensor according to claim 1, further comprising at least one rolling ball disposed in one of the first cam portion and the second cam portion, and facing an engaging surface of the other one of the first cam portion and the second cam portion.

5. The torque sensor according to claim 1, wherein the driving slider has a guiding pin, and the driven slider has a guiding groove, the guiding groove extends along a circumferential direction of the driven slider by ¼ of a circumference of the driven slider, and the guiding pin is disposed in the guiding groove.

6. The torque sensor according to claim 5, wherein the guiding groove has a first end and a second end.

7. The torque sensor according to claim 2, wherein the first sleeve is a spring adjusting screw, and is threadedly engaged with the third sleeve.

8. The torque sensor according to claim 1, wherein the third sleeve has a body, a cantilever protruding and extending from the body, and a bottom, the other one of the magnetic sensor and the magnetic member is disposed on the cantilever, the cantilever has a first surface, the bottom has a second surface, the first surface and the second surface contact each other, and at least one of the first surface and the second surface is an inclined surface,
    when the second sleeve moves relative to the first sleeve, the first surface and the second surface move relatively to change the relative distance between the magnetic member and the magnetic sensor.

9. The torque sensor according to claim 1, further comprising a friction plate disposed between the driven slider and the second sleeve.

10. The torque sensor according to claim 1, further comprising:
    a first ball bearing sleeved on the first side of the first sleeve; and
    a second ball bearing sleeved on a fourth side of the driving slider, wherein the head portion has a third side, and the fourth side is sleeved on the third side corresponding to the driving slider.

* * * * *